United States Patent
Kempf

(10) Patent No.: US 9,986,135 B2
(45) Date of Patent: May 29, 2018

(54) SPATIALLY LOCALIZED CLUSTER COMPRESSION

(71) Applicant: Texas Instruments Incorporated, Dallas, TX (US)

(72) Inventor: Jeffrey Matthew Kempf, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days. days.

(21) Appl. No.: 14/940,508

(22) Filed: Nov. 13, 2015

(65) Prior Publication Data
US 2017/0142426 A1    May 18, 2017

(51) Int. Cl.
*G06K 9/00*    (2006.01)
*H04N 1/64*    (2006.01)

(52) U.S. Cl.
CPC ................. *H04N 1/644* (2013.01)

(58) Field of Classification Search
CPC .. H04N 19/186; H04N 19/176; H04N 19/463; H04N 1/644; G06K 9/36; G06K 9/4652
See application file for complete search history.

(56) References Cited

U.S. PATENT DOCUMENTS

| | | | | |
|---|---|---|---|---|
| 5,664,080 A | * | 9/1997 | Lucas | G09G 5/06 345/593 |
| 2009/0010533 A1 | * | 1/2009 | Hung | H04N 19/46 382/166 |
| 2013/0176211 A1 | * | 7/2013 | Inada | G06T 1/60 345/156 |

* cited by examiner

*Primary Examiner* — Eueng-Nan Yeh
(74) *Attorney, Agent, or Firm* — Michael A. Davis, Jr.; Charles A. Brill; Frank D. Cimino

(57) ABSTRACT

In a method of image compression, a processor computes a palette for a block of pixels, the palette having palette values; and the processor computes index values, where some index values map a pixel to a palette value and some index values map a pixel to a value that is between two palette values.

12 Claims, 6 Drawing Sheets

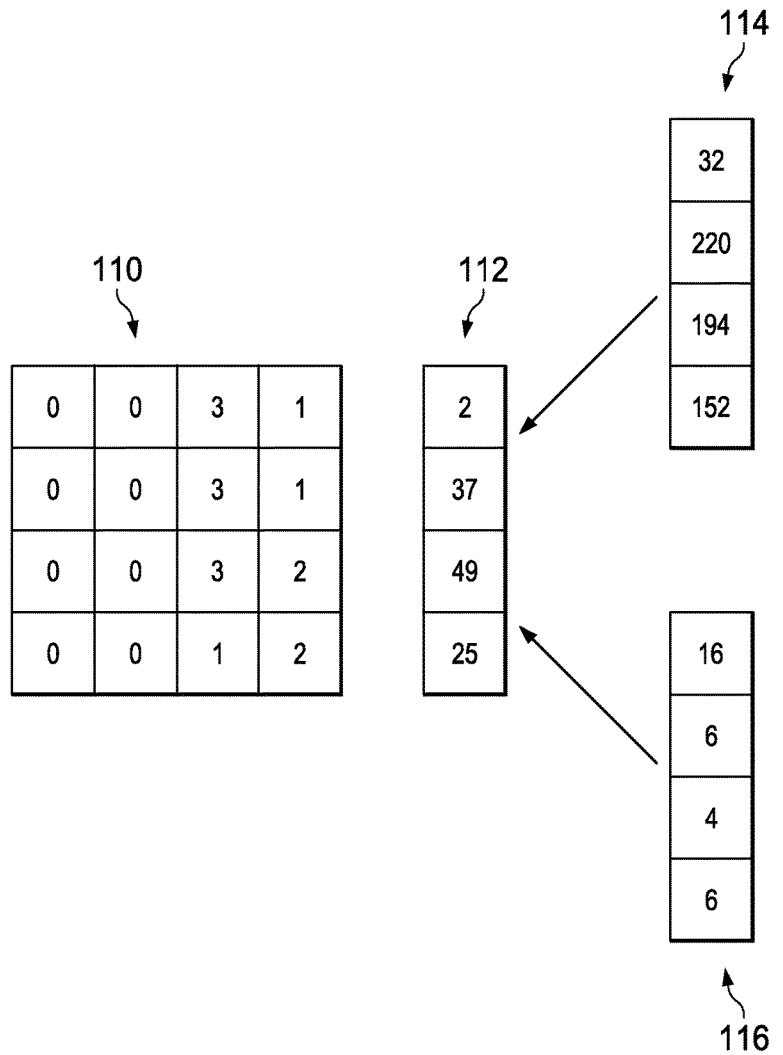

```
EDGE THRESHOLD = 18
PALETTE SUM (1) = 0
PALETTE COUNTER (1) = 1
PALETTE VALUE (1) = 1ST PIXEL VALUE
    FOR ITERATION = 1 TO 3
        For N = 1 TO 16
            IF
                |PIXEL(N) - NEAREST PALETTE VALUE| > EDGE THRESHOLD
                AND NUMBER OF PALETTE VALUES ≤ 4
            THEN
                CREATE NEW PALETTE SUM = PIXEL(N)
                CREATE NEW PALETTE COUNT = 1
                NEW PALETTE VALUE = (PALETTE SUM)/(PALETTE COUNT)
            ELSE
                FOR NEAREST PALETTE VALUE, PALETTE SUM = PALETTE SUM + PIXEL(N)
                FOR NEAREST PALETTE VALUE, INCREMENT PALETTE COUNT
                NEAREST PALETTE VALUE = (PALETTE SUM)/(PALETTE COUNT)
        NEXT N
    IF
        ITERATION > 1
        AND NUMBER OF PALETTE VALUES ≤ 4
    THEN
        RESET PALETTE COUNTERS AND PALETTE SUMS
        REDUCE EDGE THRESHOLD
    NEXT ITERATION
```

FIG. 2

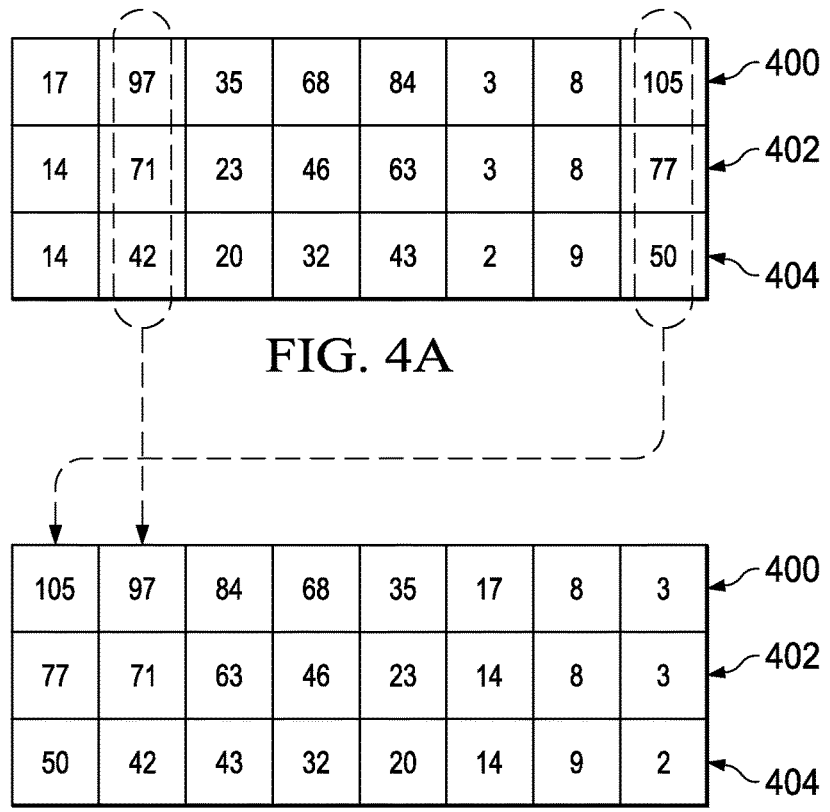
FIG. 4A
FIG. 4B
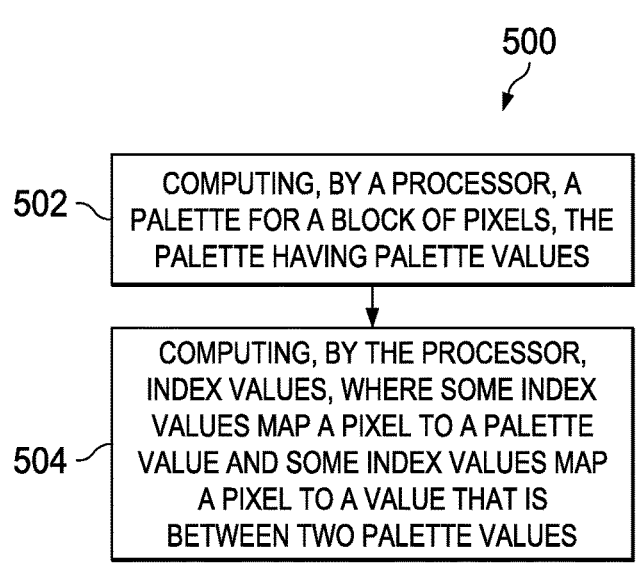
FIG. 5

SPATIALLY LOCALIZED CLUSTER COMPRESSION

BACKGROUND

In general, digital images require significant memory for storage and require significant time and bandwidth for transmission. Digital images are often compressed to reduce storage requirements and to reduce transmission time and bandwidth. There are lossless compression techniques and lossy techniques. Typically, when a guaranteed compression ratio is needed then lossy techniques are used. There are many lossy compression algorithms. Many of those algorithms require a substantial amount of time and processor power, both to compress and to decompress. For example, some lossy compression algorithms are based on transforms such as Fast Fourier Transform, Discrete Cosine Transform, or Wavelet Transforms. However, because of cost, or because of limited processor power, or because there is a need for speed, some systems need simple fast image compression. There is an ongoing need for fast image compression.

BRIEF DESCRIPTION OF THE DRAWINGS

FIG. 1A is a data diagram illustrating an example block of image data.

FIG. 1B is a data diagram illustrating the image data of FIG. 1A after compression.

FIG. 2 is pseudo code illustrating an example method for compressing image data as in FIG. 1B.

FIG. 4A is a data diagram illustrating example palettes.

FIG. 4B is a data diagram illustrating the palettes of FIG. 4A after reordering.

FIG. 5 is a flow chart illustrating an example method of compressing image data.

DETAILED DESCRIPTION

Figure 3A:
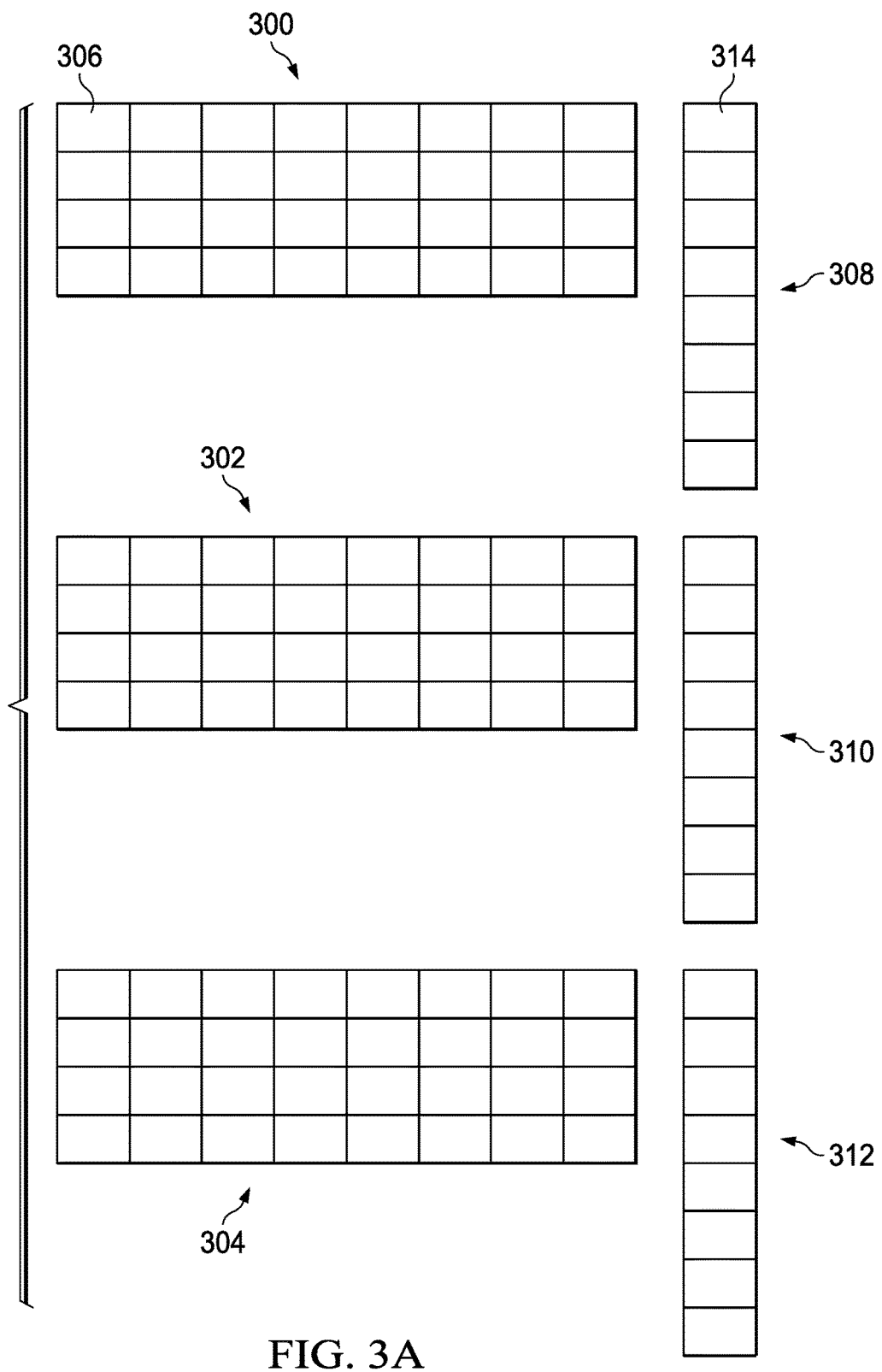
FIG. 3A is a data diagram illustrating example compressed image data and palettes.

In the following description, an image compression technique is described in which the number of color pallet values is reduced on a block-by-block basis. The resulting compressed image consists of palettes and keys (indices into the palettes). The algorithm does not require complex transforms. In particular, it can be implemented in an Application Specific Integrated Circuit (ASIC).

FIG. 1A illustrates an example block (four rows, four columns) of image data (pixel values) 100. Each pixel value is a 7-bit binary number (range is zero to 63). The size of the block 100 and the range of the pixel values are just examples for illustration and can vary. The pixel values may represent gray-scale image pixels, or the pixel values may represent image data for one dimension of a three-dimensional color image space (for example, Red-Green-Blue (RGB) or L*a*b* (where L is luminance and "a" and "b" are color coordinates)).

Before discussing the compression process, it is helpful to view the end result. FIG. 1B illustrates an example result of compressing the data of FIG. 1A. In FIG. 1B, a 4x4 index block 110 has index values corresponding to each of the pixel values in FIG. 1A, and four pallet values 112. Each of the index values 110 is a two-bit binary number (range is zero to three) that specifies one of the four pallet values 112. Each of the palette data values 112 is a 7-bit binary number. For example, index block (0,2) contains the index value 3, which specifies the fourth palette value of 25. Each palette value 112 represents a centroid of a cluster of original pixel values that map to one value in the compressed image. For example, the pixel values 22, 26, and 28 in the original image data in FIG. 1A map to a palette data value of 25 in FIG. 1B. Each palette data value 112 is the average of the pixel values that are mapped to it. For example, 25 is the average of 22, 26, and 28.

In FIG. 1B, each palette value 112 has a corresponding palette sum 114 (the sum of the pixel values mapped to the palette value over multiple iterations) and a palette counter 116 (the number of pixels mapped to the palette value over multiple iterations), and each palette value 112 is the corresponding palette sum divided by the corresponding palette counter (that is, the average of the pixel values mapped to the palette value). The palette sums 114 and palette counters 116 are temporary values used by the compression process, as discussed in conjunction with FIG. 2, and they are discarded after compression is complete.

FIG. 2 is an example flow chart (in the form of pseudo code) for a compression process resulting in palette values illustrated in FIG. 1B. Again, all numerical values are just for illustration. The example process goes through three iterations. The goal is to determine four pallet data values, each of which is the average of a number of pixels. For the first iteration, the process attempts to find four pallet data values that are separated by at least 18 (edge threshold=18). However, for the example image data illustrated in FIG. 1A, at the end of the first iteration there are only three palette data values. For the second iteration, all palette sums, palette counters, and palette data values are reset and the process repeats using an edge threshold of 4, which results in four palette values. For the third iteration, the process uses an edge threshold of zero, and the palette data values resulting from the second iteration remain unchanged (but the palette sums and palette counters each double). Once four palette data values 112 are determined, the index values 110 are determined by mapping each pixel value 100 to the nearest palette data value 112.

In the example of FIG. 1A, the total number of bits per block in the original image data is 16 pixels×7 bits per pixel for a total of 112 bits, whereas total number of bits in the compressed image data in FIG. 1B is 16 index values×2 bits per index value, plus four palette data values×7 bits per palette data value, for a total of 60 bits, resulting in a compression ratio of 112/60=1.87:1.

The human visual system has a non-uniform perceptual response to light intensity. Image data is commonly encoded in a non-linear manner (called gamma correction) to match human perception. The intensity of light generated by many displays is a linear function of the applied signal. Accordingly, it is common to transform a non-linear light signal to a linear light signal with a de-gamma correction function. It is also common to map the number of bits for the non-linear light signal to a larger number of bits for de-gamma correction. For example, if non-linear red intensity is specified by 8 bits per pixel, de-gamma corrected red intensity might require 12 bits per pixel.

An application of particular interest for the image compression technique described above is for spatial light modulators (SLMs) used for projection displays. Examples of SLMs include liquid crystal displays (LCDs) and digital micro-mirror devices (DMDs). A DMD has an array of electronically controlled mirrors, where each mirror can reflect (or not reflect) light to a screen. For all types of SLMs, illumination intensity can be controlled by pulse-width modulation (PWM). Assume, for example, a display where images are updated 60 times per second. Each image (or frame) is displayed for approximately 16.7 milliseconds. Given n bits of intensity resolution, the 16.7 millisecond frame period is further divided into $2^n-1$ time slices for pulse-width intensity modulation, where each time slice is $16.7/(2^n-1)$ milliseconds. For PWM intensity modulation, the data may be formatted into bit planes, where each bit plane corresponds to a bit weight of intensity value. Each bit plane corresponds to an appropriate number of time slices. The higher the bit plane value, the higher the number of time slices used to illuminate the pixel. If each pixel intensity is represented by an n-bit value, then each frame of intensity data has n bit planes.

FIG. 3A illustrates an actual example embodiment. There are three data blocks (300, 302, 304), one for each color dimension. Each data block (300, 302, 304) is an array of four rows by eight columns of block data values 306. Block data values 306 contain pixel values before compression, where pixel values are 8 bits before gamma correction and 12 bits after gamma correction. That is, there are a total of 36 bit planes per pixel value. Therefore, in the example embodiment, the total number of bits in the original uncompressed image data is 3 colors×32 block data values per color×12 bits (12 bit planes) per block data value=1,152 bits. After compression, each block data value 306 contains a three-bit index value. After compression, each data block (302, 302, 304) has a corresponding palette (308, 310, 312). There are eight palette data values 314 per palette, and each palette data value 314 is 12 bits. The total number of bits in the compressed image data is 32 block data values×3 index-bits per block data value, plus 3 colors×1 palette per color×8 palette data values per palette×12 bits per palette data value, for a total of 384 bits, resulting in a compression ratio of 1,152/384=3.0:1.

The compressed image data can be further compressed by compressing the palettes, as follows. The palette data values are first reordered to minimize the average distance between points in three-dimensional color space (described in more detail below). The first and last points may be used as the end points of a four-segment linear approximation of the sorted list. The second and third line-end-points are also selected from the ordered list, where the selection may be based on error minimization, with the error weighted by cluster density (described in more detail below). As a result, for each palette, four palette data values are stored and four palette data values are computed by linear interpolation.

Numbering the sorted palette data values from 0 to 7, for the second and third line-end-points there are 15 possible combinations as follows: (1,2) (1,3) (1,4) (1,5) (1,6) (2,3) (2,4) (2,5) (2,6) (3,4) (3,5) (3,6) (4,5) (4,6) (5,6). These pairs of pointers can be listed in a predetermined list, and a 4-bit interpolation code can be used as an index to select one pair from the predetermined list. Assuming that each pixel value is one dimension in a three dimensional color space, the selection of the second and third line-end-points may be made the same for all three dimensions, so only one 4-bit interpolation code is needed for all three dimensions.

Figure 3B:
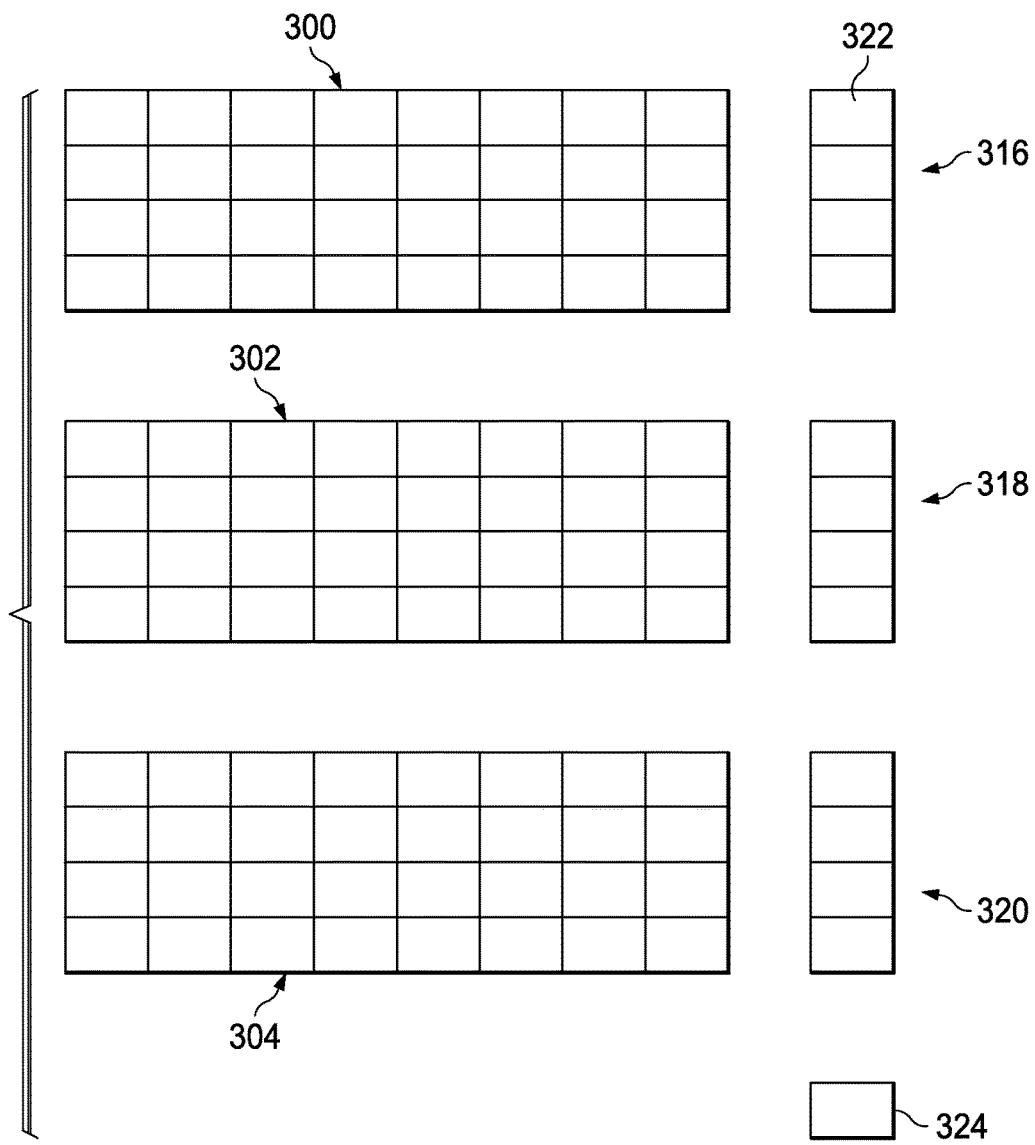
FIG. 3B is a data diagram illustrating the compressed data of FIG. 3A with compressed palettes.

FIG. 3B illustrates the data of FIG. 3A with compressed palettes. In FIG. 3B, there are three palettes (316, 318, 320), each containing four palette data entries 322, plus one 4-bit interpolation code 324. The total number of bits in the resulting compressed image data is 32 block data values per color×3 index-bits per block value, plus 3 colors×1 palette per color×4 palette data values per palette×12 bits per palette data value, plus one 4-bit interpolation code, for a total of 244 bits, resulting in a compression ratio of 1,152/244=4.72:1.

As discussed above, before compressing the palettes, the palette data values are reordered to minimize the average distance between the points in a three-dimensional color space. Mathematically, this reordering is a form of the Traveling Salesman Problem. There are many known approaches to solving the Traveling Salesman Problem and one known algorithm for solving the Traveling Salesman Problem is the Nearest Neighbor algorithm. FIG. 4A provides some example palette data values to help illustrate application of the Nearest Neighbor algorithm to reordering of palette data values. FIG. 4B illustrates the palettes of FIG. 4A after reordering.

In FIG. 4A, there are three palettes 400, 402, and 404, each having eight palette data values. Each palette (400, 402, and 404) contains pixel values that may be considered distances in one dimension of a three dimensional color space. For example, palette 400 may contain Red pixel values, palette 402 may contain Green pixel values, and palette 404 may contain Blue pixel values. Viewing the three palettes as an array of rows and columns, each column may be viewed as a point in a three dimensional space. The first step is to select a beginning point. In the following example, the three dimensional points are ordered with the first point being the brightest. If the color space is L*a*b, then the brightest point is the point with the highest value of luminance (L). If the color space is RGB, then the brightness is computed as follows:

$$\text{Brightness}=0.2126*R+0.7152*G+0.0722*B$$

For the example values in FIG. 4A, assuming a RGB color space, the brightest entry (column) is the eighth entry (R=105, G=77, B=50, Brightness=81). Starting with the eighth entry, the Euclidian distance between this RGB point and each other RGB point is calculated, and the nearest neighbor (closest Euclidian distance) is selected for the next entry in the reordered list. Euclidian distance between RGB point i and RGB point j is calculated as follows:

$$\text{Euclidian Distance}=[(R_i-R_j)^2+(G_i+G_j)^2+(B_i-B_j)^2]^{1/2}$$

For the example palettes in FIG. 4A, the nearest neighbor (nearest Euclidian distance) to the first (brightest) point (eighth entry) is the second entry (R=97, G=71, B=42). This process is repeated until the palettes are sorted in order of nearest Euclidian distance in three dimensional color space. FIG. 4B illustrates the palettes of FIG. 4A after reordering.

After reordering, the second and third line-end-points are determined, with the determination based on error minimization, with the error weighted by cluster density. For example, entries 2-6 are potential candidates for the second line-end-point. Equally spaced intermediate points may be calculated along a straight line between the first line-end-point and a trial second line-end-point. The Euclidian distance between the calculated intermediate points and the actual values in the reordered palettes may be computed, the distances may be weighted by cluster size (palette counters 116 in FIG. 1B), and the trial line-end-point that provides the smallest weighted distance between calculated and actual intermediate points may be selected as the second line-end-point. This process is repeated for the third line-end-point. A 4-bit interpolation code is then selected that corresponds to the selected second and third line-end-points.

For decoding, a 3-bit index value is read. If the index value is 0 or 7 then the first or last entry of a 4-entry palette is used. If the index value is other than 0 or 7, it is compared to the interpolation code to see if it corresponds to one of the intermediate line-end-points. If the index value corresponds to an intermediate line-end-point, then that line-end-point value is read from the corresponding entry of a 4-entry palette. If the index value is other than 0 or 7 or one of the intermediate line-end points, then a pixel value is calculated by linear interpolation between two line-end-points. For example, assume that the interpolation code specifies (3,6) as the intermediate line-end-points. An index value of 0, 3, 6, or 7 indicates that a pixel value is a palette value. An index of 1, 2, 4, or 5 indicates that a pixel value must be calculated. An index of 4 indicates that the pixel value is at a point that is one-third the distance along a line from the third palette point to the sixth palette point (from the second line-end-point to the third line-end point) in a three-dimensional color space.

FIG. 5 is a flow chart illustrating an example method 500 of compressing image data. At step 502, a processor computes a palette for a block of pixels, the palette having palette values. At step 504, the processor computes index values, where some index values map a pixel to a palette value and some index values map a pixel to a value that is between two palette values.

Figure 6:
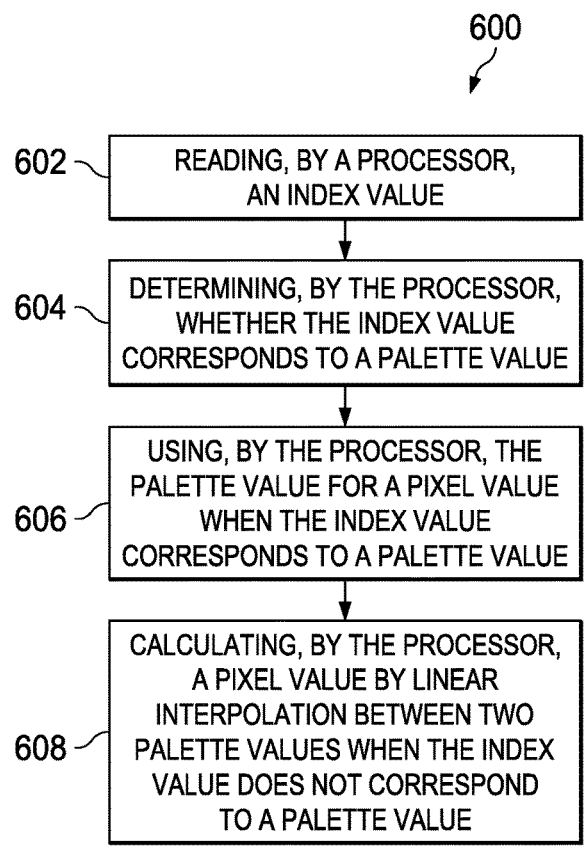
FIG. 6 is a flow chart illustrating an example method on uncompressing image data.

FIG. 6 is a flow chart 600 illustrating an example method on uncompressing image data. At step 602, a processor reads an index value. At step 604, the processor determines whether the index value corresponds to a palette value. At step 606, the processor uses the palette value for a pixel value when the index value corresponds to a palette value. At step 608, the processor calculates a pixel value by linear interpolation between two palette values when the index value does not correspond to a palette value.

Figure 7:
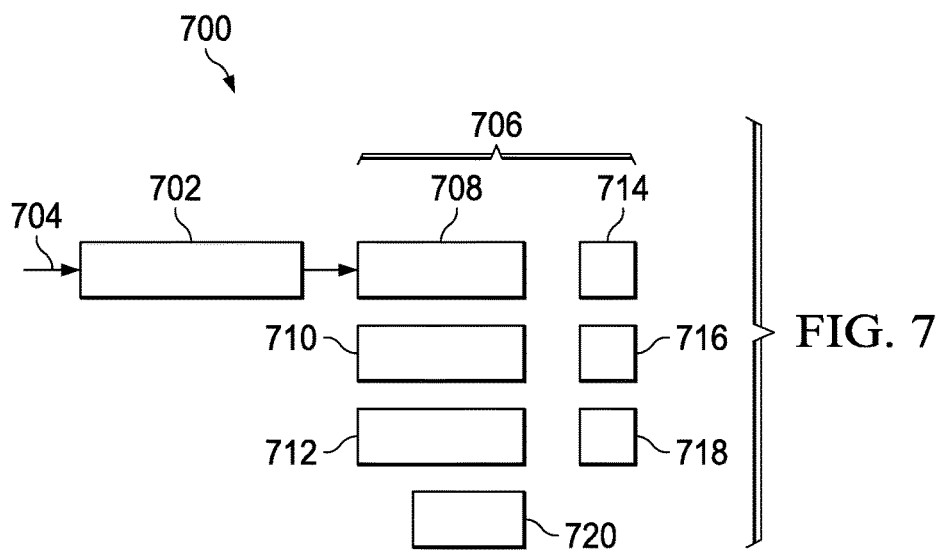
FIG. 7 is a block diagram of an example embodiment of a system for compressing image data.

FIG. 7 is a block diagram of an example embodiment of a system 700 for compressing image data. The system 700 may be, for example, part of a system for controlling a digital micro-mirror device. The system 700 may be an image processor. A processor (or controller, or ASIC) 702 receives image data 704. The processor 702 compresses the data as discussed above. The processor outputs (stores or displays) compressed image data 706. The compressed image data comprises blocks of index values (708, 710, 712), palettes (714, 716, 718) and an interpolation code 720.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A method of compressing an image, the method comprising:

computing, by an integrated circuit, a palette for a block of pixels of the image, the palette having an array of columns and rows, and the rows including: a first row of palette values in a first color space dimension; a second row of palette values in a second color space dimension; and a third row of palette values in a third color space dimension; so each column includes a respective palette value from the first row, a respective palette value from the second row, and a respective palette value from the third row;

selecting, by the integrated circuit, a subset of the columns, so a remainder of the columns are unselected columns;

per pixel within a first group of the block's pixels, mapping a column from among the selected subset whose palette values represent the pixel, by storing an N-bit index value of the mapped column for the pixel, wherein N is an integer greater than 1; and per pixel within a second group of the block's pixels, mapping a pair of columns from among the selected subset whose palette values are linearly interpolatable to represent the pixel, by storing a coded N-bit index value of the mapped pair for the pixel;

wherein selecting the subset of the columns includes selecting the subset based on a number of the columns to be selected, and based on minimizing errors between: palette values of the unselected columns; and palette values that are linearly interpolatable between columns of the selected subset.

2. The method of claim 1, wherein the errors are weighted by how many of the block's pixels are represented by linear interpolation of the mapped pair's palette values.

3. The method of claim 1, further comprising:

for the block, storing a single interpolation code for identifying the pair of columns mapped by the pixel's coded N-bit index value.

4. The method of claim 1, further comprising:

determining, by the integrated circuit, a brightest column of the palette; and ordering, by the integrated circuit, the columns of the palette, beginning with the brightest column and continuing therefrom in order of increasing Euclidian distance from the brightest column, in three dimensional color space.

5. A method of uncompressing a compressed image, the method comprising:

reading, by an integrated circuit, a palette for a block of pixels of the image, the palette having an array of columns and rows, and the rows including: a first row of palette values in a first color space dimension; a second row of palette values in a second color space dimension; and a third row of palette values in a third color space dimension; so each column includes a respective palette value from the first row, a respective palette value from the second row, and a respective palette value from the third row;

reading, by an integrated circuit, N-bit index values for the block's pixels, wherein N is an integer greater than 1;

per pixel within a first group of the block's pixels, by the integrated circuit, identifying one of the columns as being mapped by the pixel's N-bit index value, and reading the identified column's palette values to represent the pixel; and per pixel within a second group of the block's pixels, by the integrated circuit, identifying a pair of the columns as being mapped by a coding of the pixel's N-bit index value, reading the identified pair's palette values, and calculating a linear interpolation of the identified pair's palette values to represent the pixel.

6. The method of claim 5, wherein identifying the pair of the columns includes:

for the block, reading a single interpolation code; and in response to the single interpolation code, identifying the pair of the columns mapped by the coding of the pixel's N-bit index value.

7. Apparatus for compressing an image, the apparatus comprising:
an integrated circuit to:
compute a palette for a block of pixels of the image, the palette having an array of columns and rows, and the rows including: a first row of palette values in a first color space dimension; a second row of palette values in a second color space dimension; and a third row of palette values in a third color space dimension; so each column includes a respective palette value from the first row, a respective palette value from the second row, and a respective palette value from the third row;
select a subset of the columns, so a remainder of the columns are unselected columns;
per pixel within a first group of the block's pixels, map a column from among the selected subset whose palette values represent the pixel, by storing an N-bit index value of the mapped column for the pixel, wherein N is an integer greater than 1; and
per pixel within a second group of the block's pixels, map a pair of columns from among the selected subset whose palette values are linearly interpolatable to represent the pixel, by storing a coded N-bit index value of the mapped pair for the pixel;
wherein the integrated circuit is configured to select the subset of the columns based on a number of the columns to be selected, and based on minimizing errors between: palette values of the unselected columns; and palette values that are linearly interpolatable between columns of the selected subset.

8. The apparatus of claim 7, wherein the errors are weighted by how many of the block's pixels are represented by linear interpolation of the mapped pair's palette values.

9. The apparatus of claim 7, wherein the integrated circuit is configured to:
for the block, store a single interpolation code for identifying the pair of columns mapped by the pixel's coded N-bit index value.

10. The apparatus of claim 7, wherein the integrated circuit is configured to:
determine a brightest column of the palette; and
order the columns of the palette, beginning with the brightest column and continuing therefrom in order of increasing Euclidian distance from the brightest column, in three dimensional color space.

11. Apparatus for uncompressing a compressed image, the apparatus comprising:
an integrated circuit to:
read a palette for a block of pixels of the image, the palette having an array of columns and rows, and the rows including: a first row of palette values in a first color space dimension; a second row of palette values in a second color space dimension; and a third row of palette values in a third color space dimension; so each column includes a respective palette value from the first row, a respective palette value from the second row, and a respective palette value from the third row;
read N-bit index values for the block's pixels, wherein N is an integer greater than 1;
per pixel within a first group of the block's pixels, identify one of the columns as being mapped by the pixel's N-bit index value, and read the identified column's palette values to represent the pixel; and
per pixel within a second group of the block's pixels, identify a pair of the columns as being mapped by a coding of the pixel's N-bit index value, read the identified pair's palette values, and calculate a linear interpolation of the identified pair's palette values to represent the pixel.

12. The apparatus of claim 11, wherein the integrated circuit is configured to identify the pair of the columns by:
for the block, reading a single interpolation code; and
in response to the single interpolation code, identifying the pair of the columns mapped by the coding of the pixel's N-bit index value.

* * * * *